Patented May 22, 1951

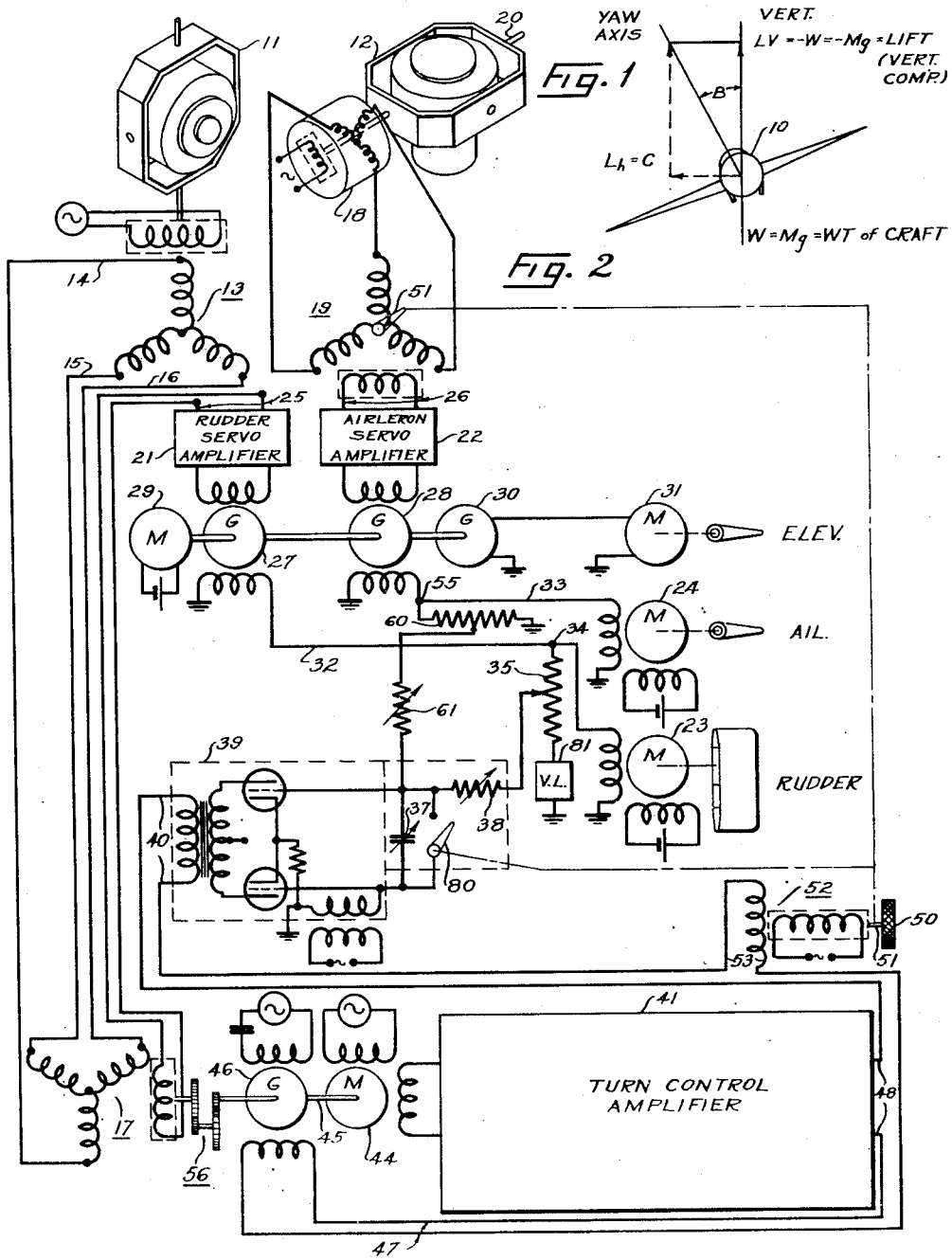

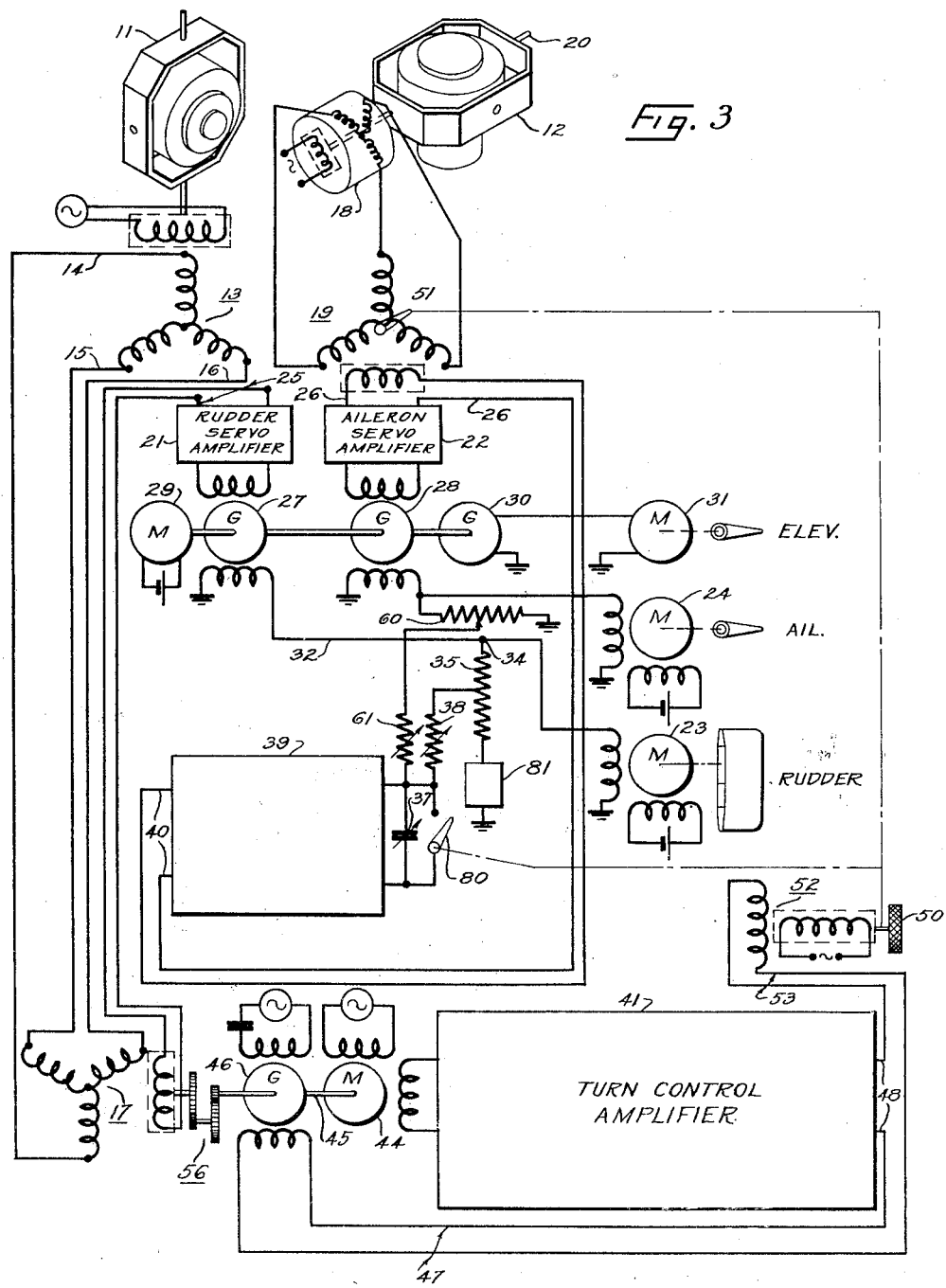

2,553,597

UNITED STATES PATENT OFFICE 2,553,597

AIRCRAFT AUTOMATIC PILOT

Jacques R. Maroni, Jamaica, N. Y., assignor to The Sperry Corporation, a corporation of Delaware Application February 23, 1946, Serial No. 649,600

8 Claims. (Cl. 244—77)

The present invention relates to improvements in aircraft automatic pilots and more particularly to automatic pilots including means for executing coordinated turns.

Automatic pilots for aircraft generally include a directional gyroscope for establishing a stable heading reference, a gyro vertical or artificial horizon for establishing a stable vertical reference and servo or positional control systems responsive to the signals from the gyros and operative through suitable relays or amplifiers to control the rudder, ailerons and elevator in a manner to stabilize the aircraft in some predetermined heading and attitude.

It is desirable to be able to employ the automatic pilot not merely for stabilizing the aircraft in straight flight, but also for making turns under automatic control. Automatic turns offer the possibility of being made more smoothly than manually controlled turns (especially at the beginning and end of the turn) and furthermore automatic turns can be made with high precision —a valuable feature in airport approach and landing maneuvers and likewise in certain military maneuvers.

Execution of perfect turns under automatic control is a problem of considerable difficulty, especially when the wide range of rates of turn and air speeds in modern aircraft is considered. Turn coordination requires a correct adjustment of three variables—rate of turn, air speed and bank angle—during the turn, and unless these variables are correctly correlated the aircraft will sideslip or skid, for reasons more fully described below. These conditions not only make for discomfort to the passengers but also, if they are not corrected, may result in putting the aircraft in a dangerous attitude. Moreover there exist irregularities during the beginning and ending of a turn that require compensation if smooth and regular turn control is to be achieved.

In an application filed concurrently herewith in the name of P. Halpert for improvements in Aircraft Automatic Pilots, Ser. No. 649,601, filed February 23, 1946, assigned to the assignee of the present application, apparatus is disclosed and claimed for automatically making coordinated turns—that is turns which are free from sideslip or skid over a wide range of rates of turn and air speeds. The Halpert invention is based on the principles that in a turn made under control of an automatic pilot, any error in coordination will reveal itself as a persistent signal in the input to the rudder or aileron servo system or both and that this signal can be employed to adjust the rudder in a manner to reduce the rudder signal to zero and thereby coordinate the turn.

The present invention relates to an improvement in apparatus of this kind, which improvement, however, is also applicable to other turn control systems. The invention resides in improved means for overcoming the effect of so-called adverse yaw.

Adverse yaw is a condition that occurs mainly at the beginning and end of a turn. On banking an aircraft to initiate a turn, there is exhibited in many aircraft a tendency to yaw in the opposite direction from that normally caused by the bank angle. Adverse yaw is explained in Millikan, Aerodynamics of the Airplane, New York, 1941, page 159, as follows: "A positive roll (clockwise) gives an increase in lift on the right wing and a decrease on the left wing. The change in direction of the relative wind produced by the roll also results in a forward inclination of the lift vector on the right side and a rearward inclination on the left. This produces a yawing moment tending to move the right wing forward, i. e. a negative yawing moment. The unsymmetrical drag forces associated with the unsymmetrical lift distribution furnish an opposing or positive yawing moment. However the latter is always smaller than the moment produced by the incined lift forces. Hence . . . in a rolling airplane the up-going wing is retarded and the down-going wing is accelerated forward."

The invention of the acknowledged copending application initially applies rudder which counteracts adverse yaw, but this action is interfered with to some extent by the skid-preventing means of said application which is supplied to secure correctly banked turns and which acts to reduce persisting rudder deflections. In the present invention a better correction for adverse yaw is secured by counteracting the aforesaid anti-skid means during the roll-in period and the adverse yaw is corrected in a way which imposes a minimum load on the electrical turn control system.

The present invention is based on the discovery that when an aircraft is being put into a turn by means of an automatic pilot operating on the rudder and ailerons there exists a rudder signal which is due to the displacement of the course index and in part to an attempt of the automatic pilot to overcome adverse yaw and there also exists an aileron signal due to the initial displacement of the aileron index to bank the aircraft. These signals are all in the same sense. That is in beginning a left turn there is a left rudder signal and a left-aileron signal. On the other hand if during the turn the rate of turn is incorrect for the bank angle the rudder and aileron signals will have opposite sense. For example, in a left turn if the aircraft skids there will occur a left rudder signal, to increase the rate of turn, and a lift-aileron down signal which tries to decrease the bank angle.

According to the present invention signals are taken from both the rudder servo system and the aileron servo system, are added in opposition and are applied to the rate-of-turn control system. The signals thereby cancel or at least partly nullify each other during the roll-in period, i. e., during initiation of the turn, so that the rudder reducing signal is rendered largely ineffective to change the rate of turn at this time. But during a steady turn state, if side slip occurs the signals add rather than cancel so that a corrective signal reaches the rate-of-turn control means.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

The invention and the principles on which it is based, together with so much of the invention of the acknowledged application as is necessary to an understanding of the invention, are illustrated in the accompanying drawings, in which—

Fig. 1 is a diagram showing the relations obtaining between bank angle and other quantities in an aircraft during a turn, Fig. 2 is a diagrammatic showing of a specific embodiment of apparatus within the purview of the invention, and Fig. 3 is a diagrammatic showing of a modified form of the apparatus of Fig. 2.

As an aid to an understanding of the invention there is shown in the diagram of Fig. 1 the relation between bank angle and other quantities in the case of an aircraft, indicated at 10, during a turn.

An aircraft in straight and level flight represents an equilibrium of forces wherein drag is balanced by thrust, and weight by the vertical component ($L_v$) of lift. Lift is the component of the resultant force acting on an aircraft in a direction at right angles to the relative wind. In straight and level flight L is vertical and is equal to the weight of the aircraft.

To make a turn the aircraft is banked to some angle B (which in level flight is the angle between vertical, and the normally-vertical axis of the aircraft; or what amounts to the same thing the angle between a line through the wing tips and horizontal). This action establishes a horizontal component of lift $L_h$ which furnishes centripetal force C to make the aircraft turn at some rate S. The function of $L_h$ is analogous to the function of a string in the case of a stone being whirled; it constrains the object to a circular path in lieu of its normal straight path.

Centripetal force $C = L_h = MV^2/R = MVS$ where M is the mass of the aircraft, S is angular velocity or rate of turn; R the radius of the turn and V the airspeed. Since $\tan B = L_h L_v = L_h/Mg$, then $\tan B = VS/g$, where $g$ is the acceleration of gravity. Thus for a given bank angle and air speed one definite rate of turn is required if the necessary centripetal force is to be obtained. If the above relation between B, V, S and $g$ is departed from, side slip or skid will occur.

For the relations above to hold exactly the lift L of the aircraft is assumed to be increased to a value L' as by adjustment of the elevator so as to keep the vertical component of lift, $L_v$, the same as in level flight. The relations above also assume steady conditions, that is conditions obtaining during a continued turn. As stated, on going into a turn the lift has a component tending to cause yawing of the aircraft. That is the lift cannot be represented as a single vector perpendicular to the plane defined by the longitudinal and transverse axes of the aircraft.

In order to understand the present invention there is shown in Fig. 2 a turn control system as disclosed in the acknowledged copending application, to which the present invention is applied. The apparatus includes a directional gyro 11 and a gyro vertical 12 mounted in an aircraft (not shown). The directional gyro is provided with a pickoff or synchro 13 shown as of the Selsyn transmitter type, which is connected via leads 14, 15, 16 with a second transmitter Selsyn 17 by adjustment of which the angular relation between the aircraft and the gyro can be changed at will to fly any desired heading or to make turns in a manner to be described. The gyro vertical is provided at 18 and 19 with a similar pair of Selsyn pickoffs on the roll axis 20, for control of the aircraft in roll or bank.

The outputs of pickoffs 17 and 19 are delivered via leads 25, 26 to servo amplifiers 21, 22 of conventional type which in the system shown are arranged to control rudder and aileron servomotors 23, 24 through the agency of a motor-generator set of the Ward-Leonard type. Thus, the outputs of the amplifiers energize the field circuits of the D. C. generators 27 and 28 the armature circuits of which energize the servomotor armatures via leads 32 and 33 and ground. The servomotor fields are energized from a constant source. The generators are driven by a motor 29.

Deviation of the aircraft from a heading or bank angle predetermined by the settings of Selsyns 17 and 19 is detected by the gyros and corrected by the rudder and aileron servo systems in a known manner.

A similar pickoff system (not shown) is usually provided for the pitch axis of the gyro vertical, to control the elevator servo generator 30 and servomotor 31.

The rudder servo energization lead is tapped at 34 and the rudder signal employed to adjust the rate of turn in a sense to make the rudder signal zero. Thus, the rudder signal is taken off via a potentiometer 35 and applied to an integrating network comprising capacitance 37 and resistance 38, and thence to a modulator 39. The purpose of the modulator is to obtain an alternating output voltage at 40 of amplitude and phase corresponding to the amplitude and polarity of the D. C. signal at 35.

A turn control amplifier 41 of the character shown in the hereinbefore noted Halpert application provides an output that drives a motor 44, the shaft 45 of which moves the stator of Selsyn 17 through reduction gearing indicated at 56. The motor also drives a generator 46 the output of which is supplied via leads 47 to the input 48 of the amplifier, so as to make the speed of the motor accurately proportional to the signal supplied the amplifier 41.

A turn control knob 50 is provided which is adapted on displacement from zero or detent position to turn the aileron Selsyn 19 mounted on the knob shaft 51 so as to cause the aircraft to roll or bank and thereby initiate a turn. The knob also operates a signal generator 52 so constructed and arranged as to supply at 53 voltage of amplitude and phase corresponding to the amount and sense of the displacement of the knob. That is the voltage at 53 is proportional to the bank angle set in by the knob.

A switch 80 is provided, operable from the turn knob and arranged to short-circuit condenser 37 and thereby render the error correction circuit inoperative except when the knob is set to initiate a turn.

Leads 53 are connected in series with the modulator output leads 40 and the amplifier input, as shown.

The factor of proportionality between voltage 53 and the amount of bank set in by knob 50 depends on the relation $B = \tan^{-1} VS/g$, and is ordinarily adjusted so that this relation will be satisfied at the minimum cruising speed of the aircraft for which the apparatus is intended. However, if desired, the adjustment can be with respect to any other air speed since error is corrected in any case.

A voltage limiter 81 is advantageously inserted between resistor 35 and ground, to permit the use of very high sensitivity to errors in turn rate and to limit the charging rate of condenser 37 to obtain short period stabilization and long period error correction. The limiter may take the form of a pair of copper oxide rectifiers connected back to back or other circuit elements having a non-linear current-voltage characteristic.

According to the present invention the aileron servo signal is tapped at 55 by a potentiometer 60 and supplied to a resistor 61 which in combination with the condenser 37 serves as an integrating network for the aileron signal. The connections at 34 and 55 are such that the voltages thereat are opposed when the rudder and aileron signals are in the same sense as described above, and add when the rudder and aileron signals are in opposite sense.

In operation, to make a turn the knob 50 is displaced so as to bank the aircraft, thereby initiating a turn. A voltage appears in leads 53 as described, which is amplified in 41 and which drives motor 44 at a rate proportional to the voltage. When adverse yaw is present as in most aircraft the rudder signal will be augmented due to the effort of the rudder servo system to correct the adverse yaw. As the craft is rolling into the turn the rudder reducing signal will be picked off at 34 to change the speed of the motor 44 to reduce the error signal and hence reduce the rudder displacement from norm. However, the aileron servo signal which exists while the aircraft is rolling into the turn largely counterbalances the rudder reducing signal at the integrating network, so that only a nominal amount of rudder reducing signal gets through to the modulator. Adjustment of potentiometer 60 determines the amount of counteracting aileron signal relative to rudder signal.

During the turn the motor 44 rotates Selsyn 17 at some rate which corresponds to the correct rate of turn for the minimum air speed but which will be low for air speeds greater than this.

If the aircraft is turning at the correct rate, the rotation of Selsyn 13 relative to the directional gyro is exactly matched by the rotation of Selsyn 17 by the motor, and the output at 25 is zero. Hence, under such conditions there is no signal at the rudder servo amplifier and the rudder remains centralized.

On the other hand if the rate of turn is incorrect for the particular bank angle and air speed, Selsyn 17 rotates at a different rate from that of Selsyn 13 relative to the gyro and a signal appears at 25 which excites generator 27 and supplies current to motor 23 to cause deflection of the rudder.

This motor actuating current or rudder signal is picked off at 34 and is converted to A. C. by modulator 39 as described and is supplied to the amplifier 41 and is combined therein with the signal induced in 53 at the turn knob 50, and thus changes the speed of rotation of Selsyn 17 until the output at 25 becomes zero. The turn is then properly coordinated.

During the turn the aileron signal is ordinarily zero but if a signal occurs due to improper turn conditions it will be in a sense to aid the rudder reducing signal in correcting the rate of turn.

The rapidity of the correction of rate of turn upon appearance of a given rudder signal is determined by the setting of potentiometer 35 in combination with adjustment of resistance 38 and capacitance 37. In general these constants are adjusted so that several seconds are required for a rudder reducing signal to become fully effective to change the rate of turn. This makes it possible for short period deviations of the aircraft due to gusts which last a fraction of a second up to a second or two, to be corrected by the gyro and servo system in the usual way, while a persistent rudder signal is corrected in the manner described.

An important advantage of the present invention is that overloading of the integration network is avoided. In order to obtain the desired large time constant for the network capacitance 37 in general is quite large, for example, several microfarads. A strong rudder signal such as may occur in adverse yaw is sometimes sufficient to block the network so that it does not resume its intended functioning for several seconds after the turn has begun. In the system of the present invention this is prevented from happening, even in the case of aircraft having excessive adverse yaw characteristics.

Although the invention has been described with principal reference to correction of the rate of turn in response to a persistent rudder signal, it is advantageous in some cases to change the bank angle in order to eliminate side slip or skid. Such a modification of the invention is shown in Fig. 3. The only change from the system of Fig. 2 is that the output of the modulator is supplied in series with the aileron servo amplifier input at 26, instead of to the turn control amplifier.

In the system of Fig. 2, since the turn control motor 44 is operated in response to rudder (or aileron) signal in a sense to make such signal zero, it is not strictly necessary so far as coordination during the turn is concerned, that an arbitrary turn signal be applied to the turn control amplifier from the turn knob. That is, generator 52 and leads 53 could be omitted. However provision of these elements is desirable partly because the load on the circuit 34—38—39—40 is reduced and partly because the arbitrary turn signal assists the aircraft in going into the turn by working against adverse yaw.

Similarly in the apparatus of Fig. 3 it is not strictly essential than an arbitrary bank signal be applied to the aileron, since the rudder signal would eventually result in banking of the aircraft to an angle such that side slip and skid are eliminated. However a smoother functioning is obtained with use of the arbitrary turn and bank signals as described.

The error correction system of the invention also affords full correction for the so-called gimbal error, characteristic of directional gyros as they are ordinarily mounted. During a banked turn at a rate which actually is constant with respect to the earth, the movement of the aircraft relative to the gyro does not take place at a constant rate. Instead it is retarded and accelerated in a cyclic manner, the maxima and minima occurring at certain orientations of the aircraft relative to the gyro, the amount or amplitude of the variations varying with a trigonometric function of the bank angle. The gimbal error can thus give rise to spurious signals which would tend to change the rate of turn when such adjustment is improper. In the present apparatus all departures of the absolute rate of turn in space about the true vertical axis from that required for non-skid turns are detected by appearance of a rudder displacement signal for the rudder servo motor 33 and the rate of turn set up on the variable speed motor M is varied accordingly to maintain such true rate of turn. The airplane, therefore, even though banked steeply, will execute a smooth, uniform turn at the proper banking angle. I secure with my invention a quicker and more effective correction of this error than heretofore secured in that to secure these corrective signals I employ both a signal responsive to persistent rudder displacement and a signal responsive to persistent aileron displacement which are combined to increase the rate of change of turn rates otherwise appearing by reason of gimbal error.

In conventional aircraft the members for controlling heading and bank angle take the form of rudder and ailerons, respectively. However, the invention is not restricted to use with such control surfaces. For example, in multi-engine aircraft the throttles can be employed to aid in steering, and in certain other aircraft spoilers are used to supplement the ailerons in banking. The present invention is applicable to use with various control members capable of applying restoring moments to the aircraft in heading and bank.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a turn control for an automatic pilot for aircraft having ailerons and a rudder, servo means for controlling the ailerons, and servo means for controlling the rudder, a turn controller including means for setting in a desired angle of bank for controlling said servo means to effect a desired bank of said craft and a turn at a proportionate rate, means responsive to persistent rudder deflection for automatically modifying the preset rate of turn of the craft to eliminate such deflection, and means responsive to aileron deflection for opposing said modifying means during the roll-in period of the turn.

2. Means for obtaining correctly banked turns in an automatically piloted aircraft including a course maintaining device, an attitude maintaining device, means for setting in a desired banking angle and initiating a proportionate rate of turn through said attitude device and course device respectively, means responsive to departure of the craft from the rate of turn so initiated for altering such rate of turn until such rates match, and means for opposing said modifying means only during the roll-in period of the turn.

3. An automatic pilot for aircraft including motive means for controlling the craft about its roll axis, motive means for controlling the craft about its yaw axis, signal means for operating said yaw axis motive means, signal means for operating said roll motive means, means responsive to persistence of said yaw signal for progressively reducing the same, means responsive to persistence of said roll signal, and means for combining said signals algebraically such that said two signals oppose during the roll-in period to minimize the reduction of rudder deflection and add after a steady state turn has been reached to maximize the reduction of rudder deflection.

4. In an automatic pilot for aircraft including heading and bank references, means for producing signals corresponding to deviation of the aircraft in heading and bank from a reference condition, a turn servo operable by the signal of said heading signal means, a bank servo operable by the signal of said bank signal means, a turn controller for said turn and bank servos providing signals operable to cause the craft to turn at a predetermined rate with a predetermined banking angle, feedback signal means for said turn servo, means for providing a signal upon persistent operation of said bank servo, and means operable during the roll-in period of the turn for opposing the signal of said turn feedback means by the signal due to the persistent operation of said bank servo to correct the craft for adverse yaw.

5. A turn control for automatic pilots for aircraft having yaw operating means and a heading reference, roll operating means and a bank reference, a turn controller for said yaw and roll operating means settable to cause the craft to yaw at a predetermined rate with a predetermined banking angle, means effective upon persistent operation of said yaw operating means for providing a signal operable through one of said operating means to change the rate of turn of the craft from its predetermined rate, and signal means effective during the roll-in period of the turn for opposing the signal of said rate changing signal means to correct the craft for adverse yaw.

6. A turn control for an automatic pilot for aircraft having ailerons and a rudder, means for operating the rudder including a heading reference, means for operating the ailerons including a bank reference, a turn controller for said rudder and bank operating means settable to cause the craft to turn at a predetermined rate with a predetermined banking angle, means effective upon persistent operation of said rudder operating means for providing a signal operable by way of said rudder operating means to change the rate of turn of the craft from its predetermined rate, and signal means effective with persistent operation of said aileron operation means during the roll-in period of the turns for opposing the signal of said rate changing signal means to correct the craft for adverse yaw.

7. A turn control for an automatic pilot for aircraft having ailerons and a rudder, means for operating the rudder including a heading reference, means for operating the ailerons including a bank reference, a turn controller for said rudder and bank operating means settable to cause the craft to turn at a predetermined rate with a predetermined banking angle, means effective upon persistent operation of said rudder operating means for providing a signal operable by way of said aileron operating means to change the rate of turn of the craft from its predetermined rate, and signal means effective with persistent operation of said aileron operating means during the roll-in period of the turn for opposing the signal of said rate changing signal means to correct the craft for adverse yaw.

8. In a turn control for an automatic pilot for aircraft having ailerons and a rudder, servo means for controlling the ailerons, and servo means for controlling the rudder, a turn controller including means for setting in a desired angle of bank for controlling said servo means to effect a desired bank of said craft and a turn at a proportionate rate, means responsive to persistent rudder deflection for automatically modifying the preset rate of turn of the craft to eliminate such deflection, and means responsive to aileron deflection for assisting said modifying means after the roll-in period of the turn.

JACQUES R. MARONI.

REFERENCES CITED

The following references are of record in the file of this patent:

UNITED STATES PATENTS

| Number | Name | Date |
| --- | --- | --- |
| 2,162,862 | Protzen | June 20, 1939 |
| 2,204,290 | Alkan | June 11, 1940 |
| 2,270,875 | Hanson et al. | Jan. 27, 1942 |
| 2,325,108 | Carlson | July 27, 1943 |
| 2,371,388 | Glenny | Mar. 13, 1945 |
| 2,380,425 | Frische et al. | July 31, 1945 |